United States Patent [19]

Persson

[11] 4,086,519
[45] Apr. 25, 1978

[54] HALL EFFECT SHAFT ANGLE POSITION ENCODER

[75] Inventor: Erland K. Persson, Minneapolis, Minn.

[73] Assignee: Electro-Craft Corporation, Hopkins, Minn.

[21] Appl. No.: 772,029

[22] Filed: Feb. 25, 1977

[51] Int. Cl.² .............................................. H02K 29/00
[52] U.S. Cl. .................................... 318/254; 318/138; 310/68 B; 310/DIG. 3
[58] Field of Search ................. 310/68 B, 10, DIG. 3; 318/254, 138, 439

[56] References Cited

U.S. PATENT DOCUMENTS 3,903,463  9/1975  Kanamori ............................ 318/254

Primary Examiner—Herman J. Hohauser
Attorney, Agent, or Firm—Schroeder, Siegfried, Ryan, Vidas & Steffey

[57] ABSTRACT

A Hall effect shaft angle position encoder is constructed using a plurality of magnetic elements independent of any magnetic rotor of the electrical device which may be a brushless motor or brushless tachometer. The plurality of magnetic elements has serially alternating polarities of magnetic north and south with at least one Hall effect sensor mounted in spaced and confronting relation with the magnetic elements for sensing the alternating polarities and producing output signals representative of the magnetic polarities where the signals include a ramp voltage passing through zero value. The magnetic elements are secured to the rotor outside the normal rotor elements of the device. The output signals from at least one Hall effect sensor are applied to amplifying means which may be an operational amplifier and through the use of a variable reference voltage varying in magnitude and polarity, the output voltage is shiftable to provide signals differing in phase from the Hall effect sensor output signals in accordance with the variable reference voltage polarity and magnitude.

19 Claims, 15 Drawing Figures

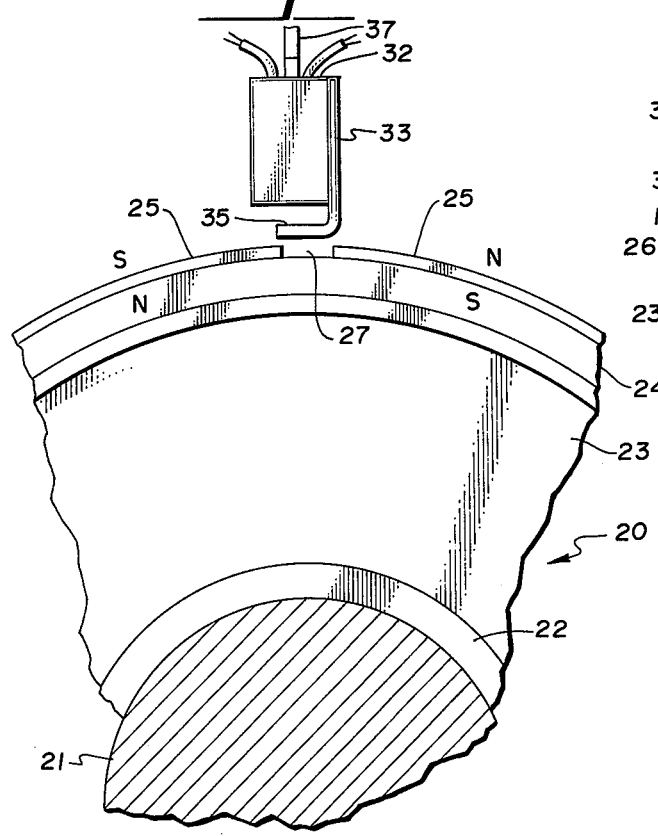
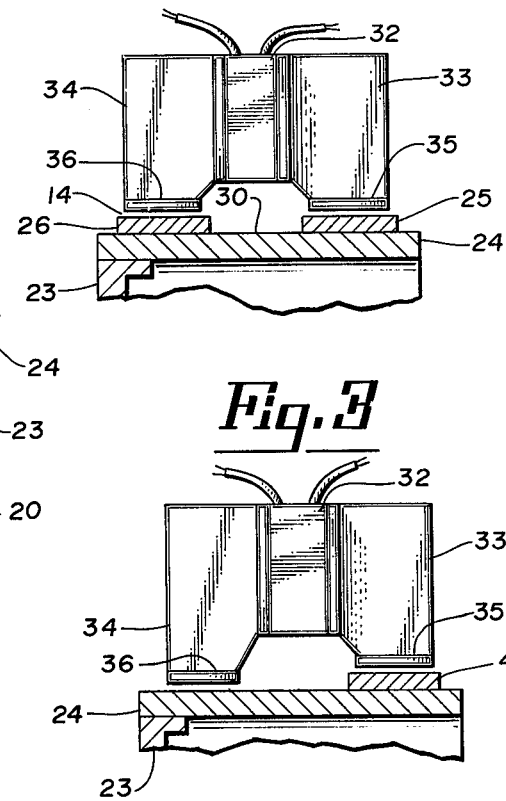
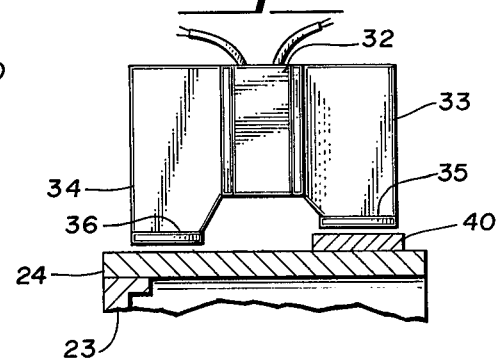
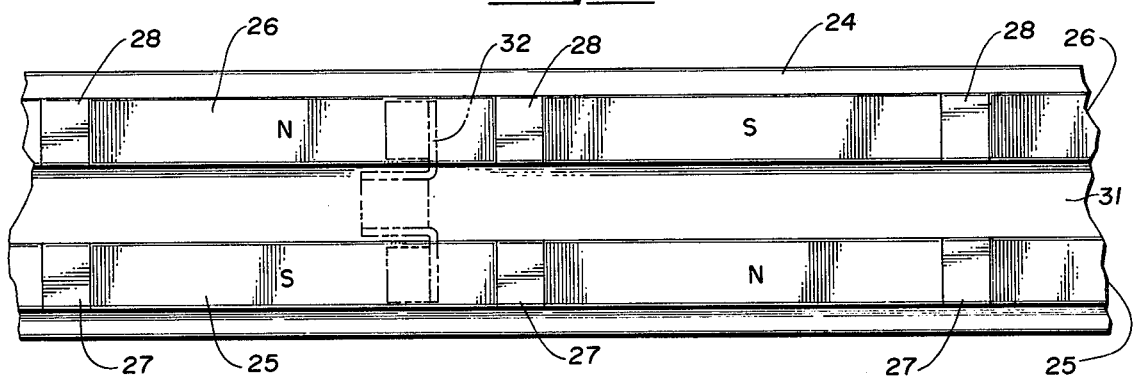
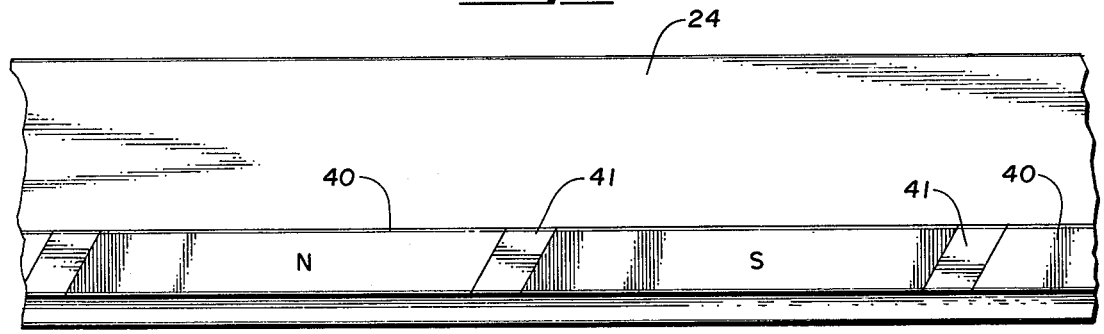

HALL EFFECT SHAFT ANGLE POSITION ENCODER

This invention relates to angular position encoding means and more particularly to a Hall effect shaft angle position encoder for use with brushless direct current motors and tachometers or other similar electrical mechanisms.

THE PRIOR ART

Generally speaking, DC brushless motors are constructed so that a rotational position of the rotor having a permanent magnet is detected using Hall effect elements or field detecting elements, sensing induction windings, and the commutation and excitation of the stator windings is thus controlled by an output from the detecting elements. Normally in such a conventional brushless motor, the stator exciting coils producing the magnetic fields for rotating and driving the rotor are disposed outside the periphery of the rotor. To detect a rotational position of a two pole rotor, generally a sensor system is employed using a pair of Hall generators displaced by 90° and disposed adjacent the periphery of the rotor. The magnetic flux which varies with each rotational phase of 90° of the rotor is detected and the output corresponding to the detected variation is electrically treated by amplification and a current is then applied to the driving coils arranged in the stator to comply with the phase variation of 90°, and thus drive the rotor.

It is also well known that in some installations of the Hall elements, grooves are formed in the surface of the iron core of the stator and the Hall elements are installed in these grooves. However, magnetic flux has the property of concentrating in places of minimum distance, and a high magnetic flux density cannot always be obtained at the parts where the Hall elements or sensors are provided in the grooves. Thus, large permanent magnets or Hall elements of high sensitivity may be necessary in order to drive associated power transistors ordinarily accompanying such Hall element sensors.

It is also known that when the output voltages from the Hall elements are increased to increase the driving current to be supplied to the stator windings, the driving current not only takes on characteristics of a square wave or pulse-like wave but also contains harmonics not included in the input signals so that an additional problem of coping with harmonic frequencies must be solved.

The foregoing descriptions of the prior art and its associated problems in which detection of the rotor elements is employed are set out in a number of prior art patents in which there is general recognition that heat created within this localized area also interferes with the Hall effect flux sensing sensors or transducers, and thus there are attendant problems in attempting to overcome the deficiencies in working with the flux fields created directly by the rotor elements. By way of example, the prior art particularly discloses certain of these problems in the following U.S. Pat. Nos.: 3,483,456, Brunner; 3,719,875, Holland; 3,688,172, Sieber; 3,200,316, Engel; 3,805,134, Osamu; 3,783,359, Malkiel; 3,716,769, Brunner; 3,743,902, Perkins; 3,831,072, Tanikoshi; 3,898,544, Tanikoshi; 3,644,765, Janson; 3,896,357, Tanikoshi; 3,383,574, Manteuffel.

The prior art referred to is directed to different forms of commutation means for brushless DC motors using Hall effect devices. However, when one attempt to use such devices in high power servo motors where high magnetic fields are present, and where a precise location of switching angles is needed, usually interference from the excitation fields in the stator structure produces an undesirable aspect and error. Therefore, it is desirable to remove the Hall effect commutation sensors to a location where stray fields are not likely to cause any influence and thus provide a commutation magnetic field system which provides the highest degree of rate of change of polarity in the region of the desired commutation points.

The present invention makes use of Hall effect sensors in cooperation with a plurality of magnetic elements independent of any magnetic rotor of the electrical device. That is, the Hall effect sensors are located where stray electromagnetic fields are generally not present to cause any undue influence upon the sensors and at the same time provide a relatively high degree of change of polarity at the region of the desired commutation points. In the present invention, high coercive force magnetic materials are disposed at a location other than the vicinity of the electrical device magnetic rotor structure and cooperating stator field.

It is therefore a general object of the present invention to provide commutation signals which are representative of a precise desired angular commutation point for use with brushless direct current motors or tachometers.

It is still another object of the present invention to provide a signal generating mechanism which is insensitive to influences of magnetic fields emanating from motor windings.

It is still a further object the present invention to provide commutation signals for use with direct current motors and tachometers which are relatively insensitive to contamination by foreign particles.

It is still a further object of this invention to provide a signal generation mechanism which is relatively insensitive to axial play in the rotor structure of a rotatable electrical device.

It is still a further object of this invention to provide a commutation structure which may be adjusted for optimum switching locations by controlling the location of the Hall generator sensors so that a precise tuning of the motor for tachometer commutation may be accomplished.

It is still a further object of the present invention to provide a commutation structure which is relatively immune to heat emanating from the stator structure of a rotatable electrical device due to power dissipation in the course of this operation.

These and other objects and advantages of the invention will more fully appear from the following description, made in connection with the accompanying drawings, wherein like reference characters refer to the same or similar parts throughout the several views, and in which:

FIG. 1 is a section of an elevational view of a Hall device in cooperation with magnetic elements rotatably mounted;

FIG. 2 is a plan or front sectional view of a Hall device in a balanced system incorporating two magnetic elements;

FIG. 3 is a plan or front sectional view of a Hall device in an unbalanced system incorporating only one magnetic element;

FIG. 4 depicts a top partial plan view of a dual magnetic element strip for use with the balanced system of FIG. 2;

FIG. 5 depicts a top partial plan view of a magnetic strip layout for use with the unbalanced system of FIG. 3;

Figure 6:
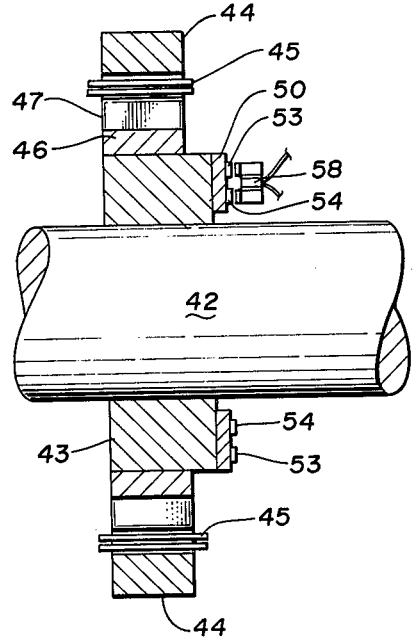
FIG. 6 is a sectional view showing the relative positioning of the Hall effect sensor in use with a tachometer taken along lines 6—6 of FIG. 7.

FIG. 1 discloses a rotatable electrical device 20 which may be either a brushless direct current motor or tachometer. Electrical device 20 has a rotatable shaft 21 to which is secured a hub 22 and radially extending support member 23 which is formed into an outer cylindrical element 24, the combination forming a drum-type surface. The lip element 24 is a flux carrying member and has a pair of magnetic elements or strips 25 and 26 secured thereto. Magnetic strips 25 and 26 may be made of a polymer bonded barium ferrite (BaFe) magnetic material such as manufactured by the 3 M Company and sold under the name "PLASTIFORM." It will be observed that the magnetic elements 25 and 26 are alternately polarized between north and south magnetic polarities extending along a radial axis of the member. Disposed between the ends of magnetic elements 25 and 26, are air gaps 27 and 28 respectively. This is best seen in FIG. 4 which shows the magnetic elements 25 and 26 extended in a planar manner to show how they are disposed on lip element 24. It will also be observed that there is an axial displacement of magnetic elements 25 and 26 by an elongated air gap 31 or lack of magnetic material. The effect of the air gaps 27 and 28, and the axial displacement between elements 25 and 26, can also be achieved by having magnet materials in those zones, but in an unmagnetized condition.

FIG. 2 discloses a balanced magnetic system in which a Hall effect sensor 32 is disposed in close proximity to magnetic elements 25 and 26 where a pair of pole pieces 33 and 34 are secured to the Hall effect sensor 12 by suitable means such as cementing. Disposed at the bottom portion of pole pieces 33 and 34 are a pair of pole shoes 35 and 36 respectively. Pole shoes 35 and 36 may have their widths either decreased or increased with respect to air gaps 27 and 28 to change the slope of the output signal from the Hall effect device. That is, by making pole shoes 35 and 36 narrower, and particularly narrower than air gaps 27 and 28, the slope of the voltage obtained from Hall effect sensor 32 will be increased. For example, with reference to FIG. 9, by making the pole shoes narrower, that is, exposing less surface area by comparison to the area between the ends of the magnetic elements shown as air gaps 27 and 28, the slope of the voltage curve will be sharper or increased.

For purposes of illustration, Hall effect sensor 32 is secured in place through a mounting 37 (FIG. 1) secured to the housing of the rotatable electrical device. As stated earlier, lip 24 is formed of a material which provides a common flux path for both magnetic elements 25 and 26 and thus the mechanism disclosed in FIG. 2 does provide a balanced system. The Hall effect transducer 32 is shown in phantom in FIG. 4 superimposed over magnetic elements 25 and 26.

Figure 9:
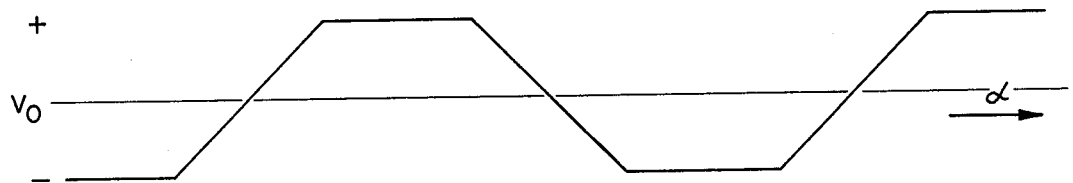
FIG. 9 is a diagram illustrating the output voltage from the operational amplifier of FIG. 8.

Because it is desirable to have a trapezoidal output voltage which has a linear slope, it will be found that this may be achieved by using the unbalanced system as well as a balanced system. In FIG. 3, a single strip of magnetic elements are formed in a parallelogram shape, and a plurality of air gaps or interspaces 41 are formed which provide another means of changing the slope of the trapezoidal voltage curves such as shown in FIG. 9. In other words, a single magnetic strip of material passes under a single pole shoe 36. The magnetic elements may appear as that just described using elements 40 and air gaps 41 or may be a type previously described, using magnetic elements 25 and air gaps 27.

The magnetic pattern disclosed in FIG. 5, which is in the form of a parallelogram is useful when a controlled trapezoidal output voltage with a relatively low slope of voltage versus the angle rotated through is desirable such as when it is useful to operate on a variable switch angle.

One of the distinct advantages of using the magnetic element arrangements disclosed in FIGS. 1 through 5 is that the drum type mechanism is relatively insensitive to any "end play" of the shaft in the axial direction. That is, slight lateral displacements of pole pieces 35 and 36 with respect to magnetic elements 25 and 26 during operation, produce a small effect upon the slope of the trapezoidal voltage passing through the zero voltage value.

Figure 7:
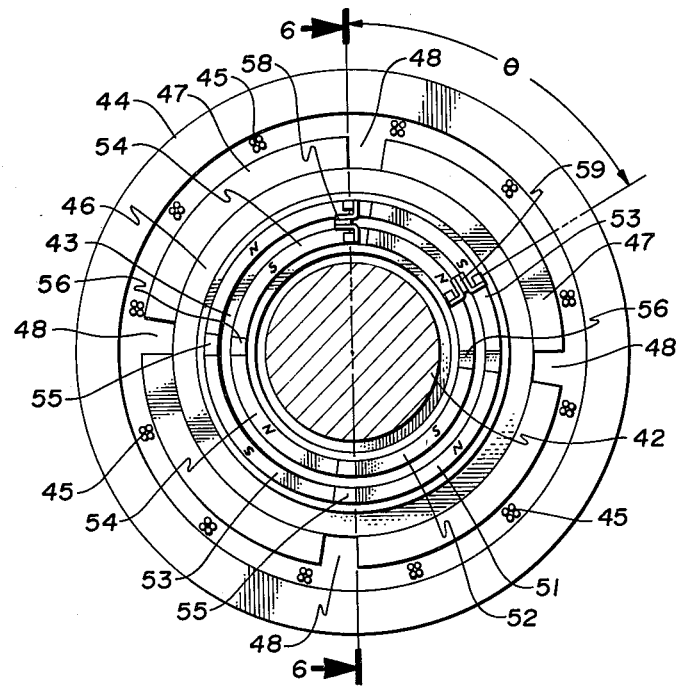
FIG. 7 is an end elevation showing the positioning of a pair of Hall effect sensors for sensing of commutation points.

For some applications, it may be more desirable to form the magnetic elements into concentric rings or strips such as shown in FIGS. 6 and 7. In that particular embodiment, there is disclosed a mechanism which may be a brushless tachometer or motor having a shaft 42, to which is secured a hub 43. Hub 43 is generally formed of a non-magnetic material such as aluminum. Using a tachometer as illustrative of this particular embodiment, a stator structure is formed at the outer periphery of the mechanism and a plurality of coils 45 are diagrammatically shown in association with stator 44. Secured to hub 43 is a magnetic flux conducting ring 46 which is generally formed of a mild steel or iron and a plurality of magnets 47 is secured to the flux backing member 46. Magnets 46 are separated by a plurality of air gaps 48. In other words, as shown in FIG. 7, there is a four pole rotor.

Another magnetic flux conducting ring 50 is secured to aluminum hub 43 by a suitable means such as cementing and forms the magnetic return path for a pair of concentric strips 51 and 52 of magnetic elements 53 and 54. Disposed between magnetic elements 53 are a plurality of air gaps 55 and disposed between magnetic elements 54 is a plurality of air gaps 56.

A Hall effect sensor 58 is disposed in spaced and confronting relationship with magnetic elements 53 and 54 to provide an output which is substantially independent of the magnetic fields existing between rotor magnets 47 and stator 44.

For commutation purposes, another Hall effect sensor 59 may be disposed at the commutation points established by the location of the tachometer windings to be commutated. Again, it is recognized that the accuracy of commutation points is achieved by minimizing the air gaps or interspaces 55 and 56 between the magnetic elements and by precisely locating Hall effect sensors 58 and 59. The angle $\theta$ between each Hall effect sensor will be determined by the number of poles of the rotor mechanism of the motor or tachometer and the number of coils being commutated. Magnetic elements 53 and 54 thus are magnetized in the same manner as described previously for magnetic elements 25, 26 and 40. Where the drum-type detection mechanism was relatively insensitive to "end play," the circular strip or concentric-type mechanism disclosed in FIGS. 6 and 7 remains relatively insensitive to motion in the radial direction or "run out."

Figure 10:
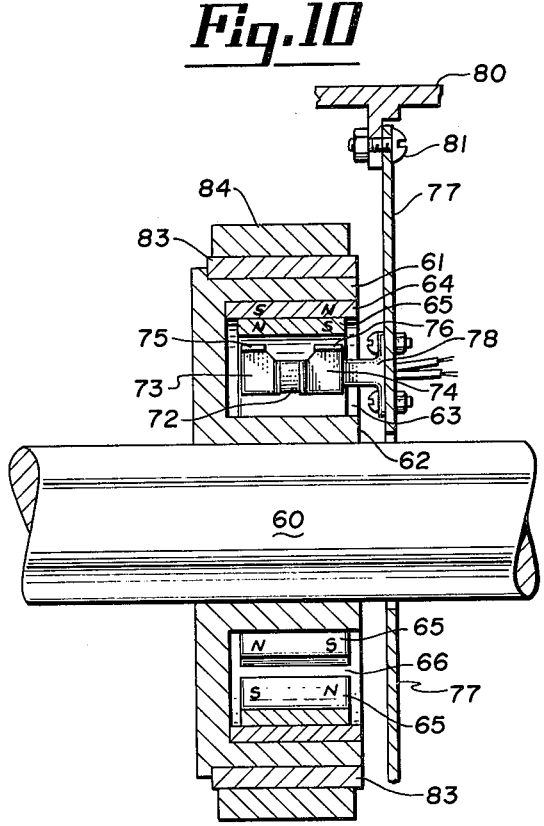
FIG. 10 is a section of a brushless direct current tachometer or motor having an inside-out arrangement of Hall effect sensor and magnetic elements taken along lines 10—10 of FIG. 11.
Figure 11:
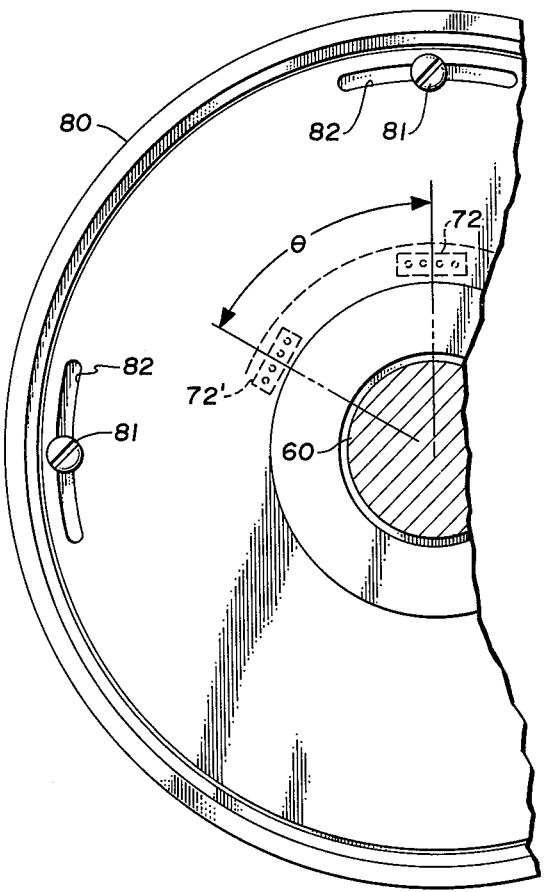
FIG. 11 is a partial end elevation showing the relative angular position of two Hall effect sensors.

Another configuration of the invention is disclosed in FIGS. 10 and 11 in which a brushless tachometer is disclosed which has a shaft 60 to which a drum 61 similar to that of FIG. 1 is secured. Drum 61 is formed of a non-magnetic material such as aluminum and is secured to shaft 60 by a hub portion 62. Drum member 61 has a hollowed concentric space 63 into which there is secured at the outer periphery thereof a magnetic flux conducting member 64 in the form of a ring which may be formed from soft iron or other suitable material and secured within drum 61 by a suitable means such as cement. Disposed radially inwardly of ring 64 is a plurality of magnetic elements 65 which are separated at their end portions by an air gap 66. A single strip of magnetic material as described earlier is magnetized in two tracks, to provide alternate north and south magnetic polarities separated by a magnetically neutral area and an oppositely magnetized polarity. Thus, within the one single magnetic element 65, there are two separate tracks similar to that disclosed in FIG. 4 and described previously. Disposed within the circular space or cavity 63 is another Hall effect sensor 72'. Hall effect sensor 72 has a pair of pole pieces 73 and 74 cemented to the sides thereof which terminate in a pair of pole shoes 75 and 76 respectively. In other words, the disclosure shown in FIGS. 1 through 3 is in effect turned "inside-out." Hall effect sensor 72 is secured to a mounting plate 77 through a mounting support or bracket 78. Plate 77 is circular in configuration and is secured to a housing 80 by suitable means such as screws 81 which pass through a plurality of circular slots 82 permitting an angular adjustment of Hall effect sensor 72.

Another magnetic flux conducting ring 83 is secured to the outer periphery of drum 61 by suitable means such as cementing and a plurality of circumferential magnets 84 are secured to ring 83 to form a tachometer magnet for a brushless tachometer.

Should it be desirable to locate another transducer or Hall effect sensor such as Hall effect sensor 72', this may be done by securing the same to plate 77 and thus precisely shifting Hall effect sensor 72 and 72' to the exact commutation point of the mechanism, depending upon the number of magnetic poles in the rotor member and the coils of the stator assembly. (It, of course, should be kept in mind that the stator assembly of FIG. 10 has been omitted which would be similar to that shown in FIG. 6. Thus the reference made to the angle $\theta$ and how it is determined, applies equally well to the disclosure of FIGS. 10 and 11 as that referring to the operation of FIGS. 6 and 7.)

Figure 8:
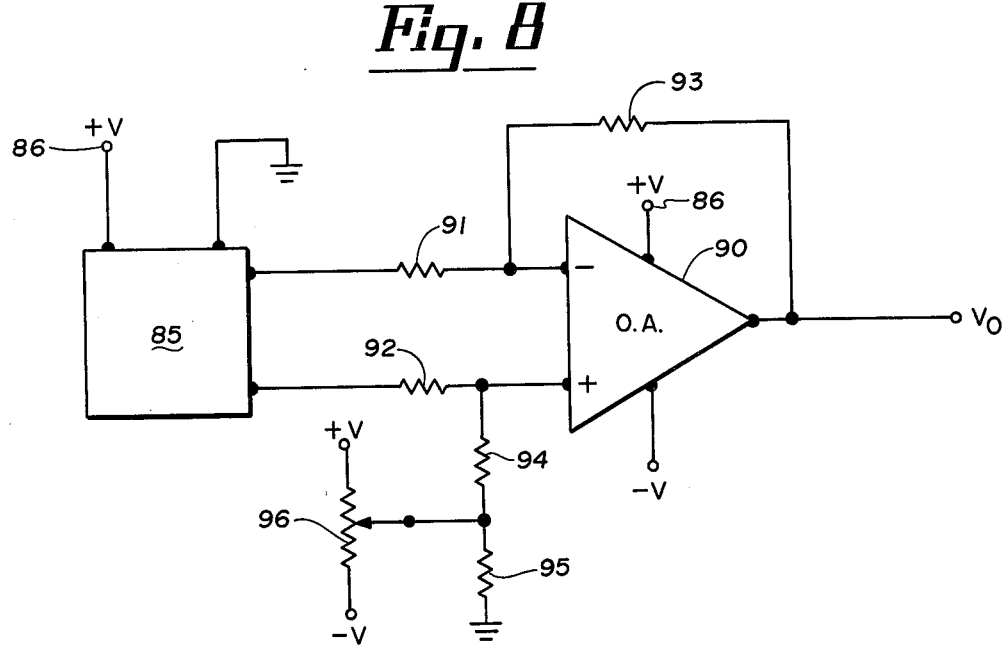
FIG. 8 shows a circuit for amplifying the output of a differential Hall device using an operational amplifier.

By reference to FIG. 8, a Hall effect sensor 85 is disposed in the same location as that described herein for Hall effect sensors and produces an output for a two terminal network. That is, Hall effect sensor 86 may be of the type manufactured by the Sprague Electric Company of Pembroke Rd., Concord, N.H., Model ULN3008M. That particular mechanism has a positive voltage applied to a terminal 86 and has the other reference terminal connected to ground. An operational amplifier 90 is connected to the Hall effect transducer 85 through a pair of input resistors 91 and 92. A feed back resistor 93 is employed to feedback part of the output voltage $V_o$ to the negative input terminal of operational amplifier 90. Operational amplifier 90, in addition to being supplied by a positive and negative voltage such as described previously, has its positive input terminal connected to a bias network of a pair of resistors 94 and 95 which are serially connected to ground. The junction of resistors 94 and 95 are connected to a potentiometer 96 which has its windings connected to the positive and negative volt supply so that the operational point of amplifier 90 may be shifted, to account for offset voltages which may appear at the output of Hall effect transducer 85, or to shift the output voltage $V_o$ to achieve changes in the zero-crossing angle. The slope of the ramp voltage portion of the trapezoidal voltage $V_o$ can be changed by adjusting the ratio of the resistors 91 and 93, as described in "Linear Applications" National Semiconductor Handbook, February 1973, page AN20-3, FIG. 5.

Figure 12:
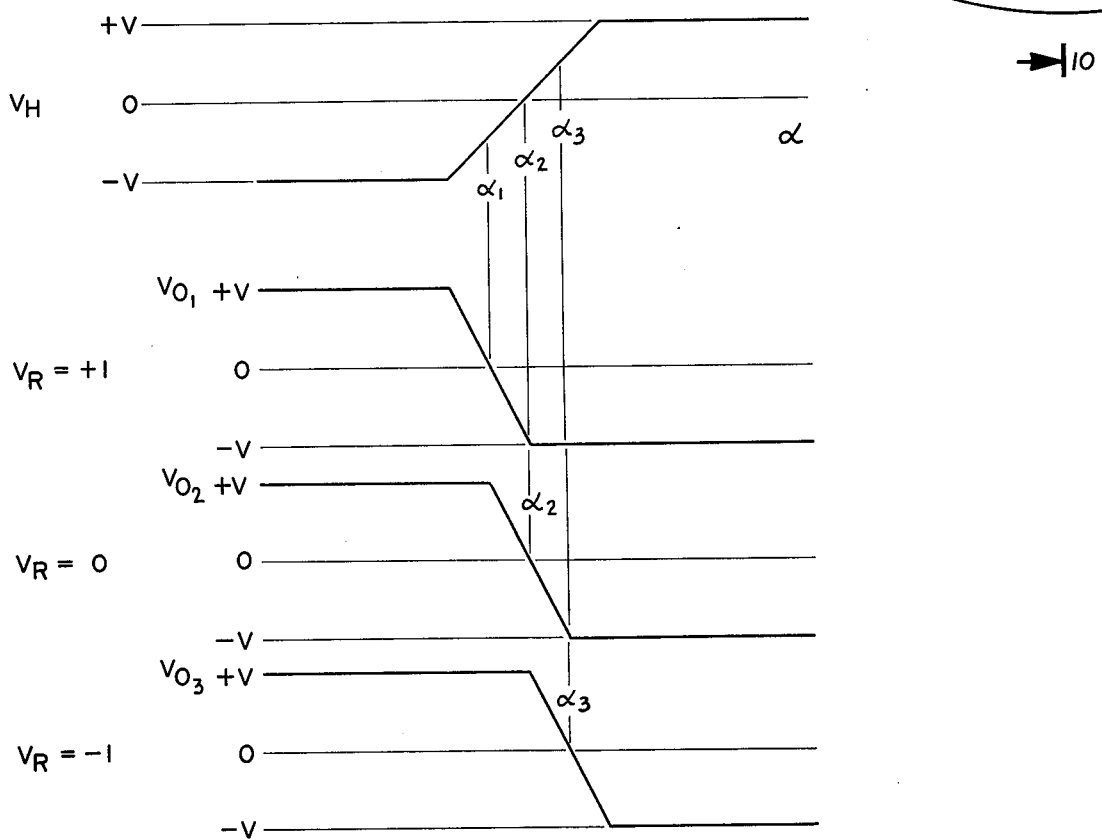
FIG. 12 is a diagram illustrating voltage phase shifting as a function of a reference voltage.

For other embodiments of the present invention, the Hall effect sensors such as that shown and described as elements 32 and 72 may be employed with an operational amplifier. For instance, in FIG. 13, the output voltage from the Hall effect device is applied to a terminal 100 and applied as an input to an operational amplifier 101 through a resistor 102. The output of operational amplifier 101 is connected to an output terminal 103 through a resistor 104 and the output voltage at terminal 103 has its voltage level controlled by a pair of back-to-back Zener diodes 105 and 106 which are connected to the ground. The Zener diodes have a limiting voltage of 6 volts each. Plus 15 volts and minus 15 volts DC are applied to operational amplifier 101. A feedback resistor 107 couples the output from operational amplifier 101 to its input which has the Hall effect voltage applied thereto and controls the voltage gain of the operational amplifier 101. Another input to operational amplifier 101 is applied through a resistor 110 that supplies a reference voltage $V_R$ through a potentiometer 111 that has its windings connected to a plus 15 volts and minus 15 volts DC. The operational curves for this circuit are shown in FIG. 12 where it will be seen that the operational crossover points where the different reference voltages $V_R$ indicate that the commutation points may be shifted in accordance with the reference voltage. Thus it will be seen that where the reference voltage $V_R$ is plus 1, the output voltage $V_{o1}$ crosses the zero reference point a $a_1$ and that where the reference voltage $V_R$ equals zero volts, the output voltage $V_{o2}$ crosses the zero voltage point at $a_2$ and where the reference $V_R$ equals minus 1, the output voltage is $V_{o3}$. The specific advantage of a device of this type is that it is possible to make the servo system produce an adjustable stop position at given angular locations by suitably having an encoder output voltage against an adjustable voltage applied to an operational amplifier. This is particularly useful where a machine operator may be able to adjust a potentiometer to finally adjust the necessary angular locations of the shaft position of a driving motor.

Another method of achieving variable switch points is to utilize the output of the Hall effect sensor and apply the voltage directly to a comparator circuit where the reference voltage is used to adjust the switching point. An example of this circuit is shown in FIG. 15, with the resulting output voltages as a function of the input voltage and reference voltage being shown in FIG. 14. Referring now to FIG. 15, an operational amplifier 120 has the Hall effect voltage $V_H$ applied to its positive input through a resistor 121 and has a reference voltage applied to its negative input terminal through another resistor 122. Operational amplifier 120 is also connected to a plus 15 volt DC source and a negative 15 volt DC source. The output of operational amplifier 120 is connected to the positive input in a feedback network through a resistor 123. Resistor 123 controls the amounts of hysteresis of the output voltage switch point versus input voltage level. The output of operational amplifier 120 is connected to a plus 15 volt DC source through another resistor 124 and the output voltage $V_o$ appears at a terminal connected through a resistor 125. A voltage limiter in the form of a diode 126 is connected between the output terminal and ground. Diode 126 prevents the voltage $V_o$ from going substantially negative. A suitable diode is of the type 1N914. It has also been found that a suitable operational amplifier may be of the type manufactured by Raytheon, Type No. 4136. The output $V_o$ of operational amplifier 120 is now in two states only (for binary operation) namely that of Logic zero (0), which is defined as zero voltage, and Logic one (1), which is in this case, essentially plus 15 volts. This same operational amplifier may be used for the other operational amplifiers described previously as operational amplifiers 90, and 101.

Figure 14:
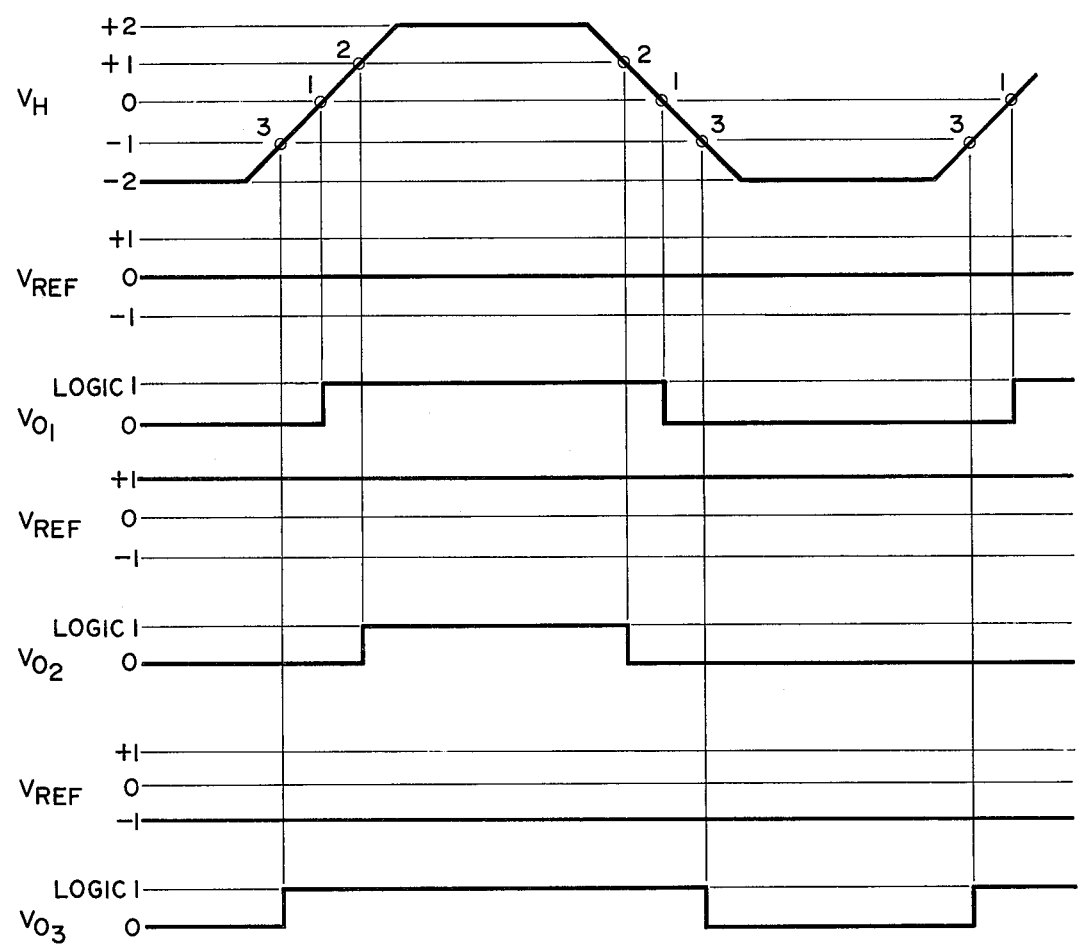
FIG. 14 is a diagram illustrating variable switch points for the output of an operational amplifier used as a comparator.
Figure 15:
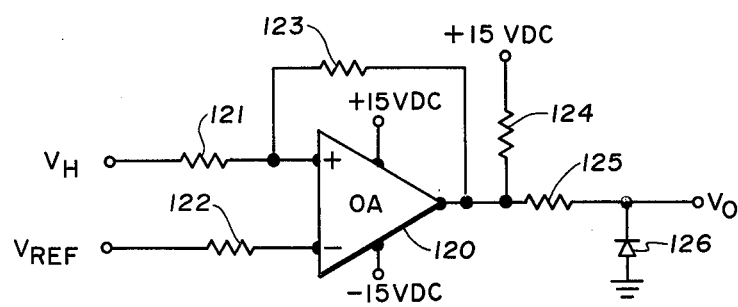
FIG. 15 is a schematic diagram of a circuit for carrying out the variable switching points illustrated in FIG. 14.

The Hall effect sensor voltage designated $V_H$ is shown as a trapezoidal voltage such as shown in FIG. 14 but in actual practice, may be a voltage which has any arbitrary periodic function which repeatedly represents a magnetic differential at the sampling point of the magnetic encoder assembly. As shown, three sets of signal functions are illustrated and are labeled with crossing points designated 1, 2 and 3. In the first set, with the reference voltage at zero value, the comparator output voltage $V_o$ is shown switching its value at the zero crossing point of $V_H$.

In the second set, the reference voltage is now made to equal +1 and as a result, the comparator output voltage $V_{o2}$ switches from a low to a high condition at the angular point where the voltage $V_H$ is equal to a +1 voltage.

In the third set, the opposite condition takes place where the reference voltage is equal to −1 and a transition point for the output voltage $V_{o3}$ takes place from a low to a high condition where $V_H$ is at a −1 value. Thus in this illustration, the output voltage transition points with reference to the value of the Hall effect transducer output, and the reference voltage, may be made available. That is, the system would therefore respond within the physical limitations of the circuit in such a fashion that the switching point of $V_o$ is proportional to the coincidence points between the reference voltage and the place where the voltage is at a zero value.

Figure 13:
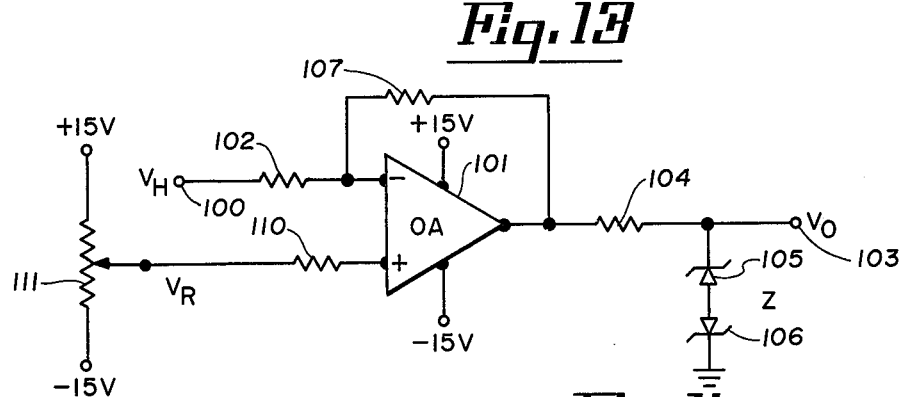
FIG. 13 is schematic diagram of a circuit for carrying out the voltage phase shifting illustrated in FIG. 12.

Through the use of the Hall effect sensor and the circuits as described in FIGS. 13 and 15, it will be apparent that variable switching points may be achieved when used with a reference voltage.

Where Hall effect sensors have been designated herein, they should also include sensors known as Magneto Resistors. Magneto Resistors have characteristics such that when they are placed in a magnetic field, their resistance increases, regardless of the magnetic field. That is, the current paths become longer when passing through the semiconductor device and the resistance increases. Magneto Resistors are made of Indium Antimonide—Nickel Antimonide and are available from the Siemens Corporation, 186 Wood Avenue South, Iselin, N.J. 08830. One type manufactured as a Differential-Magneto Resistor, No. FP 110L60, having a three terminal network, may be used in place of the Hall effect sensors disclosed earlier.

It will, of course, be understood that various changes may be made in the form, details, arrangement and proportions of the parts without departing from the scope of the invention which consists of the matter shown and described herein and set forth in the appended claim.

What is claimed is:

1. A Hall effect shaft angle position encoder for use with a rotatable electrical device, comprising:
   a. a plurality of magnetic elements independent of any magnetic rotor of the electrical device, said magnetic elements having serially alternating polarities of magnetic north and south;
   b. at least one Hall effect sensor mounted in spaced and confronting relation with said magnetic elements for sensing said alternating polarities of magnetic north and south and producing output signals representative thereof, said signals including a ramp voltage passing through zero value;
   c. rotor means including a shaft having said plurality of magnetic elements secured thereto and rotating said magnetic elements with respect to at least said one Hall effect sensor;
   d. amplifier means connected to, and amplifying the output signals of, at least one said Hall effect sensor;
   e. variable reference voltage means providing a voltage variable in magnitude and polarity;
   f. and voltage shifting means connected to said amplifier means and to said variable reference voltage means providing an output signal differing in phase from said Hall effect sensor output signals in accordance with said variable reference voltage polarity and magnitude.

2. The structure of claim 1 including:
   g. air gap means disposed between the ends of said magnetic elements.

3. The structure of claim 1 including:
   h. flux collector pole pieces secured to at least said one Hall effect sensor, said flux collector pole pieces disposed in close proximity to the path of rotational movement of said magnetic elements.

It is still another object the present invention to provide a signal generation mechanism which is insensitive to the influence of the rotor magnetic field of a rotatable electrical device.

4. The structure of claim 1 wherein said magnetic elements are arranged in the form of parallel circumferential strips.

5. The structure of claim 1 wherein said magnetic elements are formed in the shape of concentric circles.

6. The structure of claim 1 wherein said magnetic elements are mounted for shaft rotation outside any stator structure of the electrical device.

7. The structure of claim 1 wherein said amplifier means includes an operational amplifier.

8. The structure of claim 2 wherein said magnetic elements are formed in parallelogram shapes and said air gap means is formed of a parallelogram interspace between said magnetic elements.

9. The structure of claim 1 wherein at least said one Hall effect sensor is fixedly secured between said shaft of said rotor means and said plurality of magnetic elements.

10. The structure of claim 1 wherein at least said one Hall effect sensor is releasably secured for rotational positioning between said shaft of said rotor means and said plurality of magnetic elements.

11. The structure of claim 7 wherein said amplifier means includes zero crossing detector means connected to said operational amplifier to provide an output signal representative of the shaft angle position.

12. A Hall effect shaft angle commutating mechanism for use with a rotatable electrical device, comprising:
  a. a pair of magnetic elements independent of any magnetic rotor of the electrical device, said magnetic elements having serially alternating polarities of magnetic north and south and being arranged in two consecutive circular strips;
  b. a Hall effect sensor mounted in spaced and confronting relation, with one each of said pair of magnetic element circular strips for sensing said alternating polarities of magnetic north and south and producing output signals representative thereof;
  c. rotor means including a shaft having said pair of magnetic element circular strips secured thereto for rotating said magnetic elements past said Hall effect sensor;
  d. and operational amplifier means connected to said Hall effect sensors for amplifying the output signals thereof.

13. The structure of claim 12 including:
  a zero voltage crossing detector means connected to said operational amplifier means, for producing an output signal representative of the angular position of the shaft of the rotatable electrical device.

14. A Hall effect shaft angle commutating mechanism for use with a rotatable electrical device, comprising:
  a. a housing for said rotatable electrical device;
  b. a pair of magnetic elements independent of any magnetic rotor of the electrical device, said magnetic elements having serially alternating polarities of magnetic north and south and being arranged in two consecutive circular strips;
  c. a plurality of air gaps interposed between said magnetic elements within said circular strips;
  d. a Hall effect sensor mounted in spaced and confronting relation, with one each of said pair of magnetic element circular strips for sensing said alternating polarities of magnetic north and south and producing output signals including ramp voltages representative thereof;
  e. stator means operably disposed circumferentially about said rotor means including a plurality of coils adapted to carry excitation signals;
  f. and rotor means including a shaft having said pair of magnetic element circular strips secured thereto for rotating said magnetic elements past said Hall effect sensor.

15. The structure of claim 14 including:
  g. flux collector pole pieces secured to said Hall effect sensor, said flux collector pole pieces disposed in close proximity to the path of rotational movement of said magnetic elements.

16. The structure of claim 15 including:
  h. a mounting mechanism releasably securing said Hall effect sensor for rotational positioning to said housing, the position corresponding to the electrical commutation points of the electrical device in accordance with the number of said plurality of stator means coils.

17. The structure of claim 15 wherein said flux collector pole pieces each include a pole shoe in spaced and confronting relationship with said magnetic elements and said air gaps, the slope of said ramp voltages varying in accordance with the relationship of the confronting areas of said pole shoes and said air gaps.

18. The structure of claim 14 wherein said magnetic elements are formed in parallelogram shapes and said air gaps are formed of a parallelogram interspace between said magnetic elements.

19. The structure of claim 14 wherein said magnetic elements are mounted for shaft rotation outside said stator means of the electrical device.

* * * * *

UNITED STATES PATENT AND TRADEMARK OFFICE
CERTIFICATE OF CORRECTION

PATENT NO. : 4,086,519
DATED : April 25, 1978
INVENTOR(S) : Erland K. Persson

It is certified that error appears in the above—identified patent and that said Letters Patent are hereby corrected as shown below:

The first paragraph in Column 9 is misplaced and should correctly appear after the fourth paragraph in Column 2.

Signed and Sealed this

Fifth Day of September 1978

[SEAL]

Attest:

RUTH C. MASON
*Attesting Officer*

DONALD W. BANNER
*Commissioner of Patents and Trademarks*